United States Patent [19]

Schinkel et al.

[11] Patent Number: 5,126,197
[45] Date of Patent: Jun. 30, 1992

[54] HEAT-LAMINATABLE, HIGH-GLOSS MULTILAYER FILMS

[75] Inventors: Ingo Schinkel, Walsrode; Ulrich Reiners, Neuenkirchen, both of Fed. Rep. of Germany

[73] Assignee: Wolff Walsrode AG, Walsrode, Fed. Rep. of Germany

[21] Appl. No.: 601,484

[22] Filed: Oct. 22, 1990

[30] Foreign Application Priority Data

Oct. 26, 1989 [DE] Fed. Rep. of Germany ....... 3935643

[51] Int. Cl.$^5$ ............................................. B32B 7/12
[52] U.S. Cl. ................................ 428/349; 428/516; 428/518; 428/330; 428/331
[58] Field of Search ............... 428/349, 516, 518, 330, 428/331

[56] References Cited

U.S. PATENT DOCUMENTS

| | | | |
|---|---|---|---|
| 4,333,968 | 6/1982 | Nahmias | 428/349 X |
| 4,481,058 | 11/1984 | Park | 428/349 X |
| 4,629,657 | 12/1986 | Gulati et al. | 428/461 |
| 4,720,420 | 1/1988 | Crass et al. | 428/349 X |
| 4,740,421 | 4/1988 | Suzuki et al. | 428/349 |
| 4,764,425 | 8/1988 | Balloni et al. | 428/349 X |
| 4,876,139 | 10/1989 | Yamamoto et al. | 428/207 X |
| 4,956,232 | 9/1990 | Balloni et al. | 428/349 |

FOREIGN PATENT DOCUMENTS

| | | |
|---|---|---|
| 534082 | 1/1978 | Japan . |
| 60109834 | 6/1985 | Japan . |
| 2119707 | 11/1983 | United Kingdom . |

*Primary Examiner*—George F. Lesmes
*Assistant Examiner*—D. R. Zirker
*Attorney, Agent, or Firm*—Sprung Horn Kramer & Woods

[57] ABSTRACT

An improved heat-laminatable, high-glass and high-slip, at least monoaxially stretched multilayer film comprises at least one base layer I consisting essentially of polypropylene, an outer layer II which is thin by comparison with layer I and which consists essentially of polypropylene and an addition of an anti-blocking additive and a heat-activatable, heat-laminatable layer III containing an ethylene/vinyl acetate copolymer A and an ethylene/ethyl acrylate copolymer B1 and/or an ethylene/acrylic acid copolymer B2, the base layer I containing no anti-blocking additives.

8 Claims, No Drawings

HEAT-LAMINATABLE, HIGH-GLOSS MULTILAYER FILMS

This invention relates to heat-laminatable, high-gloss, at least monoaxially stretched multilayer films comprising a heat-laminatable layer for the production of a composite with various substrates, such as for example paper, cardboard, carton, metal foils and plastic films, woven fabrics, net fabrics.

For the purposes of the present invention, a heat-laminatable layer is understood to be a layer which, by virtue of its relatively large thickness, is suitable for joining the film to other substrates. Such substrates are, for example, prospectus and book covers, record sleeves and carton packs.

Multilayer films of polyolefins which comprise a stretched polypropylene layer and are coated with various heat-sealable materials, including for example polyethylene, ethylene/vinyl acetate or ionomers, are known, for example, from JP-A 60-109834 and 53-4082, from U.S. application 4,629,657 and from EP-A-0 263 882. The known multilayer films have various disadvantages, including for example inadequate inter-layer adhesion, a tendency on the part of the laminated product to curl and, in particular, unsatisfactory optical properties.

The problem addressed by the present invention was to provide heat-laminatable multilayer films which did not have the disadvantages mentioned above, particularly the unsatisfactory optical properties, and which would therefore be suitable as laminating films, particularly for high-gloss lamination.

The present invention relates to a heat-laminatable, at least monoaxially stretched multilayer film comprising, in succession, a base layer I consisting essentially of polypropylene and at least one outer layer II consisting essentially of polypropylene and known anti-blocking additives, such as for example silicon dioxide, calcium carbonate, titanium dioxide, and also polymeric anti-blocking additives, which are so adapted in their flow properties that they form their own phase in the polypropylene matrix, and at least one heat-activatable heat-laminatable, layer III containing copolymerized ethylene units. The layer III essentially contains an ethylene/vinyl acetate copolymer A) and at least one copolymer B) selected from the group B1) ethylene/ethyl acrylate copolymer and B2) ethylene/acrylic acid copolymer and in that layer I is substantially free from anti-blocking additives.

In one preferred embodiment, the base layer I consists essentially or completely of a polypropylene. An isotactic polypropylene having a density of 0.9 to 0.91 g/cm$^3$ and a melt flow index of to 4 g/10 mins. at 230° C./21.6 N (according to DIN 53 735) is preferably used. Layer I contains slip additives and antistatic additives, but is always free from anti-blocking additives.

In one preferred embodiment, the outer layer II consists essentially of polypropylene and always of anti-blocking additives. An isotactic polypropylene having a density of 0.9 to 0.91 g/cm$^3$ and a melt flow index of 1 to 4 g/10 mins. at 230° C./21.6 N (according to DIN 53 735) is preferably used. Layer II generally contains 0.01 to 0.5% by weight and preferably 0.03 to 0.1% by weight finely divided antistatic additives. Anti-blocking additives are additives which are only active at the surface. They break up the flat topography of the polypropylene surface and thus prevent the films from adhering firmly to one another and hence from blocking.

Inorganic additives incompatible with polypropylene, such as silicon dioxide, calcium carbonate, titanium dioxide and/or sodium aluminum silicate, are preferably used. However, an organic, incompatible additive, preferably polymeric particles of polystyrene, polymethyl methacrylate, polytetrafluoroethylene, polyamine and/or copolymers of these compounds, may also be finely distributed throughout the base layer. In the present context, incompatibility means that these polymers form a separate phase. They may have a different melting point and, in particular, a different modulus of elasticity from the polypropylene.

The shape and size of individual particles of the additives are selected so that only small vacuoles, if any, are formed during the stretching process.

In one preferred embodiment, the heat-laminatable layer III contains:

50 to 95 parts by weight and preferably 65 to 95 parts by weight of the ethylene/vinyl acetate copolymer A 10 to 50 parts by weight and preferably 10 to 35 parts by weight of the ethylene/ethyl acrylate copolymer B1), and/or 5 to 35 parts by weight and preferably 8 to 20 parts by weight of the ethylene/acrylic acid copolymer B2) and, optionally, 5 to 50 parts by weight of a polybutene B3), more particularly poly-1-butene.

In one particularly preferred embodiment, the heat-laminatable layer III apart from typical additives possibly present—consists of the stated copolymers A), B1), B2) and optionally B3), the parts by weight shown being percentages by weight.

In one preferred embodiment, the ethylene/vinyl acetate copolymer A) contains 70 to 95% by weight and more preferably 75 to 95% by weight polymerized ethylene units; in a particularly preferred embodiment, the remainder consists essentially or completely of polymerized vinyl acetate.

In one preferred embodiment, the ethylene/ethyl acrylate copolymer B1) essentially contains polymerized ethylene units, more particularly at least 88% by weight polymerized ethylene units and most particularly 88 to 92% by weight polymerized polyethylene units, the remainder consisting essentially or completely of polymerized ethyl acrylate.

In one preferred embodiment, the ethylene/acrylic acid copolymer B2) consists essentially of polymerized ethylene units, more particularly of at least 85% by weight polymerized ethylene units and most particularly of 85 to 95% by weight polymerized ethylene units, the remainder consisting essentially or completely of polymerized acrylic acid.

The ethylene/vinyl acetate copolymer A has a melt flow index of preferably 0.1 to 15 g/10 mins. at 230° C./21.6 N (DIN 53 735) and, more preferably, of 0.3 to 8 g/10 mins. at 230° C./21.6 N.

The multilayer film may contain standard additives and auxiliaries, such as for example lubricants and antistatic agents, in the individual layers.

The base layer I contains no anti-blocking additives whereas the outer layer II always contains anti-blocking additives.

Anti-blocking additives disturb the optical properties of the film. Optical disturbances occur in particular at the interfaces between different layers. Through the provision of the film according to the invention, it has been possible to accommodate the anti-blocking additives in only an outer layer II and thus to keep the base layer I free from anti-blocking additives. This provides the film with excellent transparency.

The boundary layer between the various polymers of the base layer I and the heat-laminatable layer III is free from disturbances so that the optical properties are further improved.

Accordingly, the multilayer films according to the invention are particularly suitable as high-gloss laminating films for the production of paper and carton composites for the finishing of graphic products, such as book covers, record sleeves, compact disc covers, prospectus covers, etc., which may even be grooved and embossed.

The multilayer films according to the invention may be produced by standard methods, such as lamination, coating, melt extrusion or melt coextrusion. In one particularly preferred embodiment, the multilayer films are stretched not only once, but biaxially.

In one preferred embodiment, the base layer I and the outer layer II are coextruded and stretched in one direction, stretching being followed by lamination or extrusion of the heat-laminatable layer III.

The multilayer film thus obtained is then stretched once more, preferably in the direction in which it has not yet been stretched.

The individual constituents of the heat-laminatable layer III are preferably combined, melted and applied to the base layer I in a single step in such a way that layer II is on the outside.

The multilayer films according to the invention are stretched at least monoaxially and preferably biaxially, longitudinal stretching preferably being carried out in a ratio of 5:1 to 7:1 and transverse stressing preferably being carried out in a ratio of 7:1 to 10:1.

In the multilayer films according to the invention, the polypropylene base layer I has a thickness of generally 8 to 50 $\mu$m and preferably 12 to 20 $\mu$m, the polypropylene outer layer II preferably has a thickness of 0.6 to 3 $\mu$m and the heat-laminatable layer has a thickness of generally 5 to 17 $\mu$m and preferably 7 to 13 $\mu$m.

The present invention also relates to a process for the production of a multilayer film according to the invention, characterized in that a base layer I is provided with a heat-activatable layer III.

The present invention also relates to a process for the production of composites from substrates of any kind and a film according to the invention, characterized in that the substrate and the film are combined under the effect of heat and preferably under only light pressure, layer III of the film according to the invention facing towards the substrate. The substrates are preferably materials of the type typically used for high-gloss lamination, including for example paper, cardboard, carton, and also films, particularly plastic films or metal foils.

EXAMPLE A

A heat-laminatable layer III containing the constituents shown in Table 1 is applied to a monoaxially stretched base film of polypropylene having a density of 0.905 g/cm$^3$ and a melt index of 3.3 g/10 mins. at 230° C./21.6 N and subsequently stretched so that a composite film stretched longitudinally in a ratio of 5:1 and transversely in a ratio of 10:1 is obtained.

The base film consists of a 1.5 $\mu$m thick outer layer II of polypropylene having a density of 0.905 g/cm$^3$ and a melt index of 3.3 g/10 mins. at 230° C./21.6 N with an addition of 600 ppm silicon dioxide having an average particle size of 4 $\mu$m and of a core layer I of the above-mentioned polypropylene with no anti-blocking additives. The base film consisting of layers I and II has an overall thickness of 15 $\mu$m while the heat-laminatable layer has a thickness of 7 $\mu$m.

Comparison Example B

A heat-laminatable layer III containing the constituents shown in Table 1 is applied to a monoaxially stretched base film of polypropylene having a density of 0.905 g/cm$^3$ and a melt index of 3.3 g/10 mins. at 230° C./21.6 N and subsequently stretched so that a composite film stretched longitudinally in a ratio of 5:1 and transversely in a ratio of 10:1 is obtained.

The base film is a single layer film of homogeneous structure and contains 600 ppm silicon dioxide having an average particle size of 4 $\mu$m in uniform distribution.

The base film has a thickness of 15 $\mu$m while the heat-laminatable layer has a thickness of 7 $\mu$m.

TABLE 1

| Composition of layer III | Copolymer A | 80% ethylene/vinyl acetate copolymer containing 21% vinyl acetate |
|---|---|---|
| | Copolymer B2 | 20% ethylene/acrylic acid copolymer containing 9% acrylic acid |

Quantities in parts by weight

TABLE 2

| | Gloss[1] GU | Haze[2] % |
|---|---|---|
| Film of Example A | 94.8 | 4.0 |
| Film of Comp. Ex. B | 91.5 | 5.3 |

Test standards:
[1] ASTM D 2457
[2] ASTM D 1003

The film of Example A according to the invention shows distinctly better optical properties than the film of Comparison Example B, particularly in the values which are extremely important for high-gloss lamination.

The gloss of the film according to the invention is higher by 3 gloss units (GU); haze has fallen by 1.3 percentage points.

Measuring Processes

To measure their optical properties, the films to be investigated were laminated to one another with their heat-laminatable layers at a temperature of 105° C. and under a pressure (linear pressure) of 180 N/cm.

The values shown are average values from 5 measurements of both sides.

We claim:

1. A heat-laminatable, at least monoaxially stretched multilayer film comprising:
   (a) a first core layer I, which consists essentially of polypropylene and is substantially free of anti-blocking additives and has a thickness of 10 to 30 $\mu$m;
   (b) a second outer layer II, which consists essentially of polypropylene and at least one anti-blocking additive and has a thickness of 0.6 to 3 $\mu$m; and
   (c) a third layer III, which is heat activatable and heat-laminatable and which consists essentially of 50 to 95 parts by weight of an ethylene/vinyl acetate copolymer A) and at least one copolymer selected from the group consisting of 10 to 50 parts by weight of B1) ethylene/ethyl acrylate copolymer and 5 to 35 parts by weight of B2) ethylene/acrylic acid copolymer and has a thickness of 7 to 20 μm.

2. A multilayer film as claimed in claim 1, characterized in that silicon dioxide, calcium, carbonate, titanium dioxide or a organic incompatible additive is used as the anti-blocking additive.

3. A multilayer film as claimed in claim 2, characterized in that an organic incompatible additive is used as the anti-blocking additive, said additive consisting essentially of polymeric particles of polystyrene, polymethyl methyacrylate, polytetrafluoroethylene and polyamine or copolymers of these compounds.

4. A multilayer film as claimed in claim 2, characterized in that one or both outsides are subjected to corona-pretreatment.

5. A film as claimed in claim 1, characterized in that
   at least 70% by weight of copolymer A consists of copolymerized ethylene units,
   at least 88% by weight of copolymer B1 consists of copolymerized ethylene units and
   at least 85% by weight of copolymer B2 consists of copolymerized ethylene units.

6. A film as claimed in claim 1, characterized in that layer III additionally contains a polybutene B3.

7. In a process for the production of composites from substrates of any kind and a film wherein the substrate and the film are combined under the effect of heat and pressure, the improvement wherein the film is a heat-laminatable, at least monoxially stretched multilayer film according to claim 1, layer III facing the substrate.

8. A process as claimed in claim 7, characterized in that the substrate is paper, cardboard, plastic, metal, wood, cloth, woven fabric, nonwoven fabric, a vegetable product or a net fabric.

* * * * *

UNITED STATES PATENT AND TRADEMARK OFFICE
CERTIFICATE OF CORRECTION

PATENT NO. : 5,126,197
DATED : June 30, 1992
INVENTOR(S) : Schinkel et al.

It is certified that error appears in the above-identified patent and that said Letters Patent is hereby corrected as shown below:

Item [57]
Title Page ABSTRACT: Line 1 delete " glass " and substitute -- gloss --

Signed and Sealed this

Twenty-first Day of December, 1993

BRUCE LEHMAN

Attest:

Attesting Officer    Commissioner of Patents and Trademarks